United States Patent
Muthiah

(10) Patent No.: US 11,651,027 B2
(45) Date of Patent: May 16, 2023

(54) DATA STORAGE DEVICE AND METHOD FOR OBJECT DETECTION AND TAGGING QUALITY OF SERVICE BASED ON STORAGE WORKLOAD

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/335,623

(22) Filed: Jun. 1, 2021

(65) Prior Publication Data

US 2022/0382809 A1    Dec. 1, 2022

(51) Int. Cl.
| | | |
|---|---|---|
| G06F 16/70 | (2019.01) | |
| G06V 20/40 | (2022.01) | |
| G06F 16/783 | (2019.01) | |
| G06F 16/75 | (2019.01) | |
| G06F 16/71 | (2019.01) | |

(52) U.S. Cl.
CPC .......... *G06F 16/7837* (2019.01); *G06F 16/71* (2019.01); *G06F 16/75* (2019.01); *G06V 20/46* (2022.01)

(58) Field of Classification Search
CPC ....... G06F 16/7837; G06F 16/71; G06F 16/75
See application file for complete search history.

(56) References Cited

U.S. PATENT DOCUMENTS

| | | | |
|---|---|---|---|
| 7,577,199 B1* | 8/2009 | Herz | G08B 13/19676 |
| | | | 375/240.16 |
| 8,564,661 B2 | 10/2013 | Lipton et al. | |
| 10,026,285 B2 | 7/2018 | Venetianer et al. | |
| 10,635,346 B2* | 4/2020 | Hodes | G06F 3/0679 |
| 10,664,452 B2 | 5/2020 | Abrashkevich et al. | |
| 10,706,887 B2 | 7/2020 | Tokutake | |
| 2004/0120581 A1 | 6/2004 | Ozer et al. | |
| 2004/0240542 A1 | 12/2004 | Yeredor et al. | |
| 2010/0153531 A1 | 6/2010 | Frazier et al. | |
| 2015/0381950 A1 | 12/2015 | Su et al. | |
| 2019/0303028 A1 | 10/2019 | Rawal et al. | |
| 2022/0147741 A1* | 5/2022 | Wang | G06V 20/46 |

OTHER PUBLICATIONS

U.S. Appl. No. 16/818,452, filed Mar. 13, 2020, entitled "Storage System and Method for Improved Playback Analysis."

(Continued)

*Primary Examiner* — Kristopher Andersen
(74) *Attorney, Agent, or Firm* — Crowell & Moring LLP

(57) ABSTRACT

A data storage device and method for object detection and tagging quality of service based on storage workload are provided. In one embodiment, a data storage device is provided comprising a memory and a controller. The controller is configured to receive a plurality of image frames for storage in the memory; identify objects in the plurality of image frames; maintain a map that associates each identified object with image frames of the plurality of images frames that contain the identified object; receive a request for image frames that contain an object of interest; and use the map to identify which image frames of the plurality of image frames are associated with the object of interest. Other embodiments are provided.

16 Claims, 8 Drawing Sheets

(56) References Cited

OTHER PUBLICATIONS

U.S. Appl. No. 16/903,930, filed Jun. 17, 2020, entitled "Storage System and Method for Object Monitoring."
International Search Report dated May 4, 2022 for International Application No. PCT/US2022/012863.
Written Opinion dated May 4, 2022 for International Application No. PCT/US2022/012863.

* cited by examiner

DATA STORAGE DEVICE AND METHOD FOR OBJECT DETECTION AND TAGGING QUALITY OF SERVICE BASED ON STORAGE WORKLOAD

BACKGROUND

A host can store data, such as a video stream, in a memory of a data storage device. If the host wants to later search the stored video for an object of interest, the host can retrieve the stored video from the memory of the data storage device and perform an image analysis operation on the retrieved video to determine if the video contains the object of interest.

DETAILED DESCRIPTION

Overview

Figure 1A:
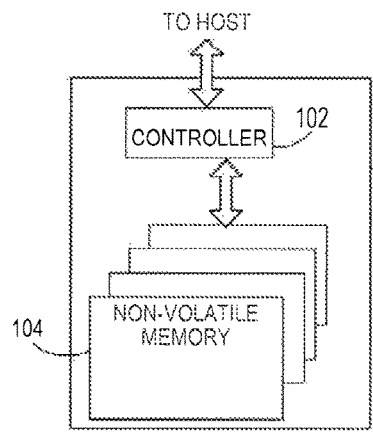
FIG. 1A is a block diagram of a data storage device of an embodiment.

By way of introduction, the below embodiments relate to a data storage device and method for object detection and tagging quality of service based on storage workload. In one embodiment, a data storage device is provided comprising a memory and a controller. The controller is configured to receive a plurality of image frames for storage in the memory; identify objects in the plurality of image frames; maintain a map that associates each identified object with image frames of the plurality of images frames that contain the identified object; receive a request for image frames that contain an object of interest; and use the map to identify which image frames of the plurality of image frames are associated with the object of interest.

In some embodiments, the controller is further configured to send at least one of the following in response to the request: the identified image frames, logical block address of the identified image frames, or frame numbers of the identified image frames.

In some embodiments, the controller is further configured to perform image processing on the identified image frames.

In some embodiments, the controller is further configured to archive the identified image frames.

In some embodiments, the controller is further configured to store the plurality of image frames in different areas in the memory such that image frames associated with different objects are stored in different areas in the memory.

In some embodiments, the controller is further configured to determine an interval at which to identify objects in the plurality of image frames such that object analysis is performed on some, but not all, of the plurality of image frames.

In some embodiments, the interval is determined based on a workload of the controller.

In some embodiments, the workload of the controller comprises one or more of the following: a garbage collection operation, a wear leveling operation, a read scrubbing operation, or a memory failure handling operation.

In some embodiments, the plurality of image frames are organized as a plurality of sets of image frames, and the map associates each identified object with a set that contains an image frame that contains the identified object.

In some embodiments, the plurality of image frames are from one or more surveillance videos.

In some embodiments, the memory comprises a three-dimensional memory.

In another embodiment, a method is provided that is performed in a data storage device comprising a memory. The method comprises: tagging image frames based on objects identified in the image frames; storing, in the memory, the image frames and a table associating the tags and the image frames; receiving a request for image frames containing a target object; and searching the table to find image frames that are relevant to the target object.

In some embodiments, the method further comprises sending at least one of the following in response to the request: the image frames that are relevant to the target object, logical block address of the image frames that are relevant to the target object, or frame numbers of the image frames that are relevant to the target object.

In some embodiments, the method further comprises performing image processing on the image frames that are relevant to the target object to identify which of the image frames contains the target object.

In some embodiments, image frames associated with different objects are stored in different areas in the memory.

In some embodiments, the method further comprises determining an interval at which to tag the image frames.

In some embodiments, the interval is determined based on a workload of the controller.

In some embodiments, the workload of the controller comprises one or more of the following: a garbage collection operation, a wear leveling operation, a read scrubbing operation, and a memory failure handling operation.

In some embodiments, the image frames are organized as a plurality of sets of images frames, and the table associates each identified object with a set that contains an image frame that contains the identified object.

In another embodiment, a data storage device is provided comprising: a memory; means for receiving a plurality of image frames for storage in the memory; means for identifying objects in the plurality of image frames; means for maintaining a map that associates each identified object with image frames of the plurality of images frames that contain the identified object; means for receiving a request for image frames that contain an object of interest; and means for using the map to identify which image frames of the plurality of image frames are associated with the object of interest.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
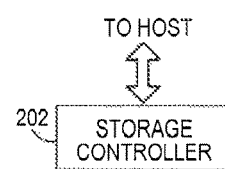
FIG. 1B is a block diagram illustrating a storage module of an embodiment.
Figure 1B:
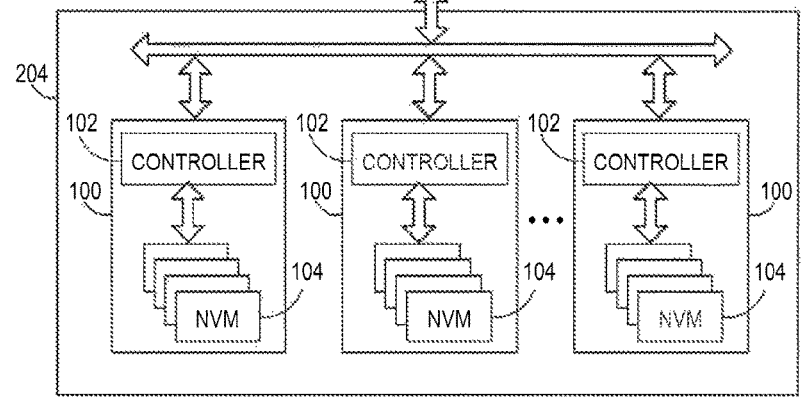
Figure 1C:
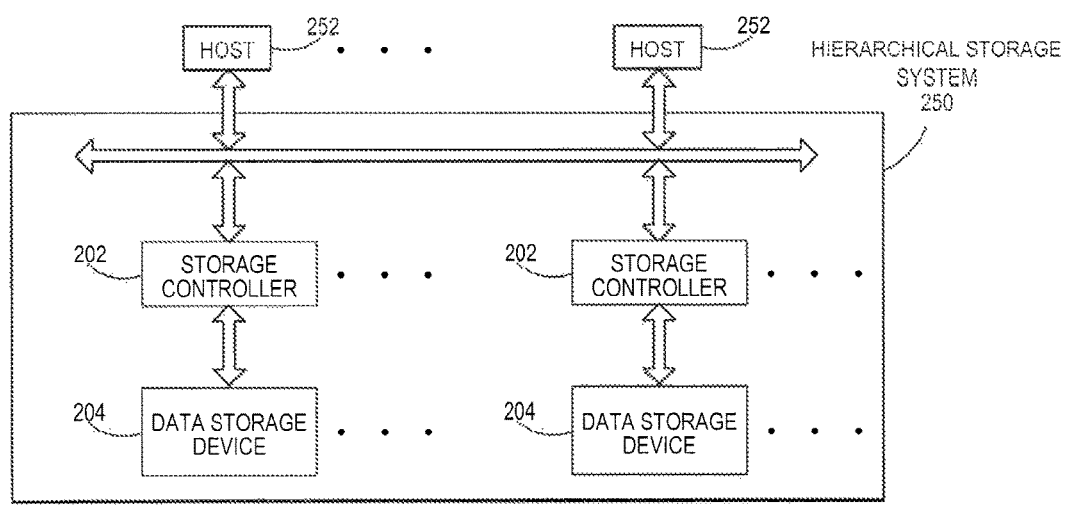
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
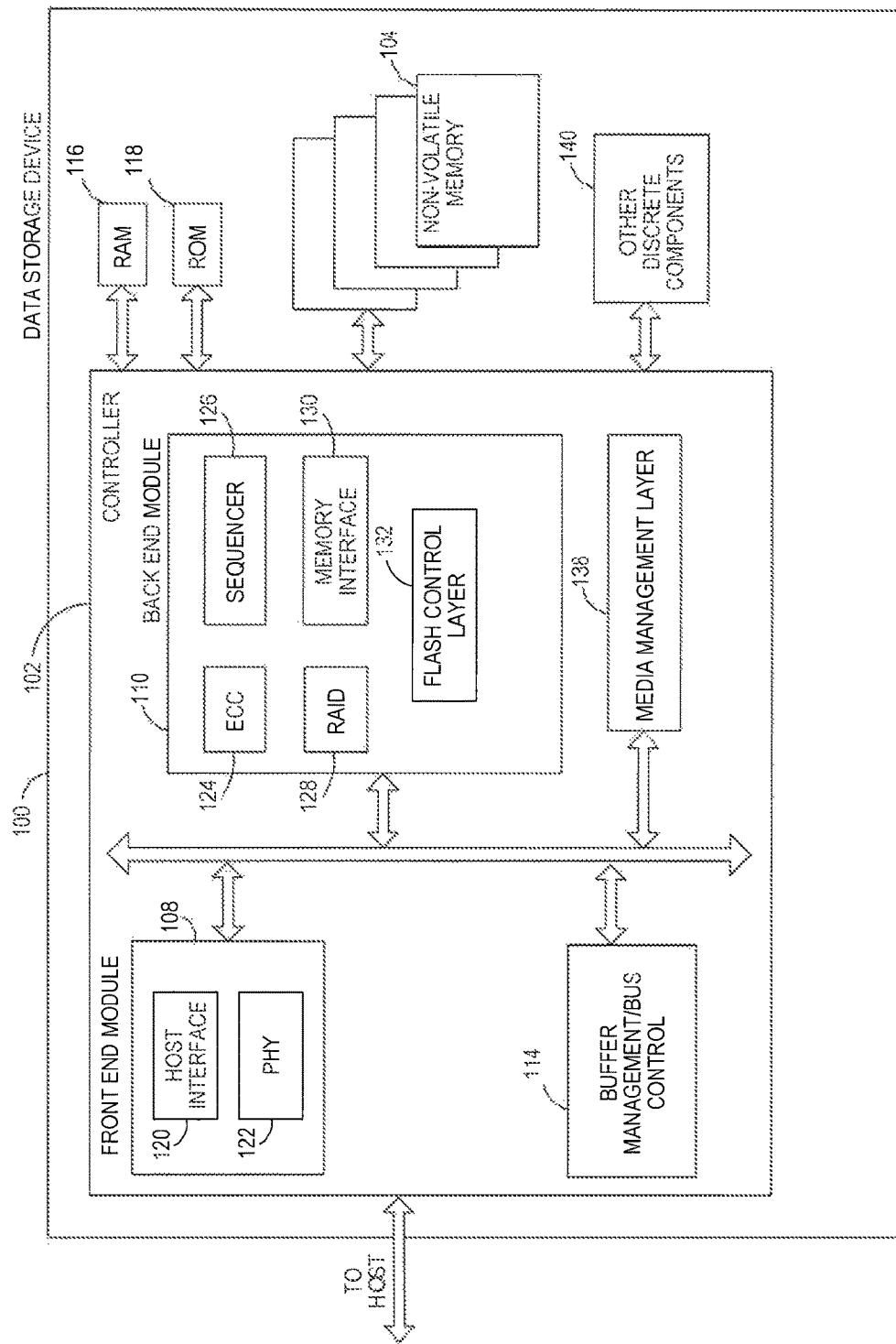
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
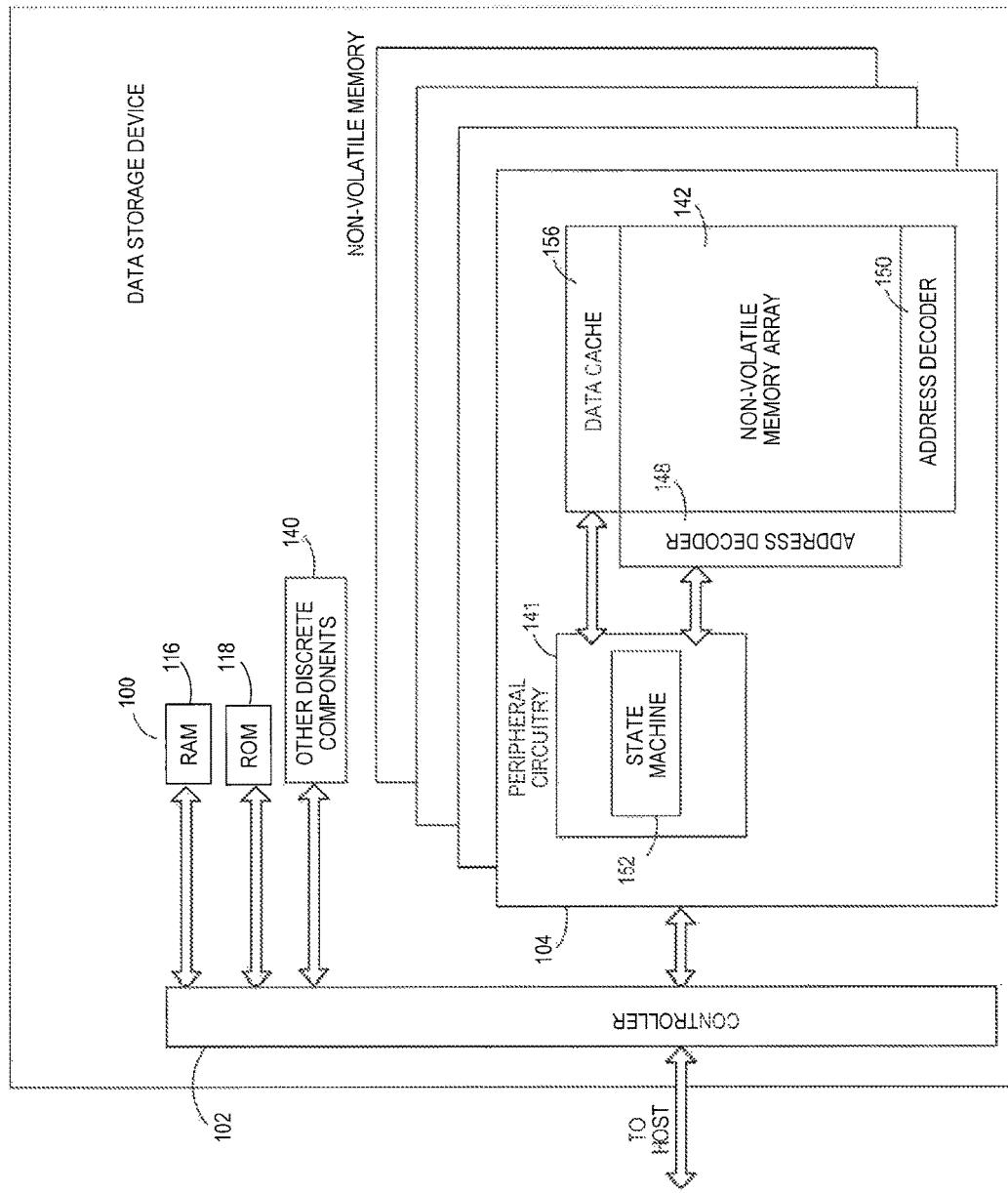
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
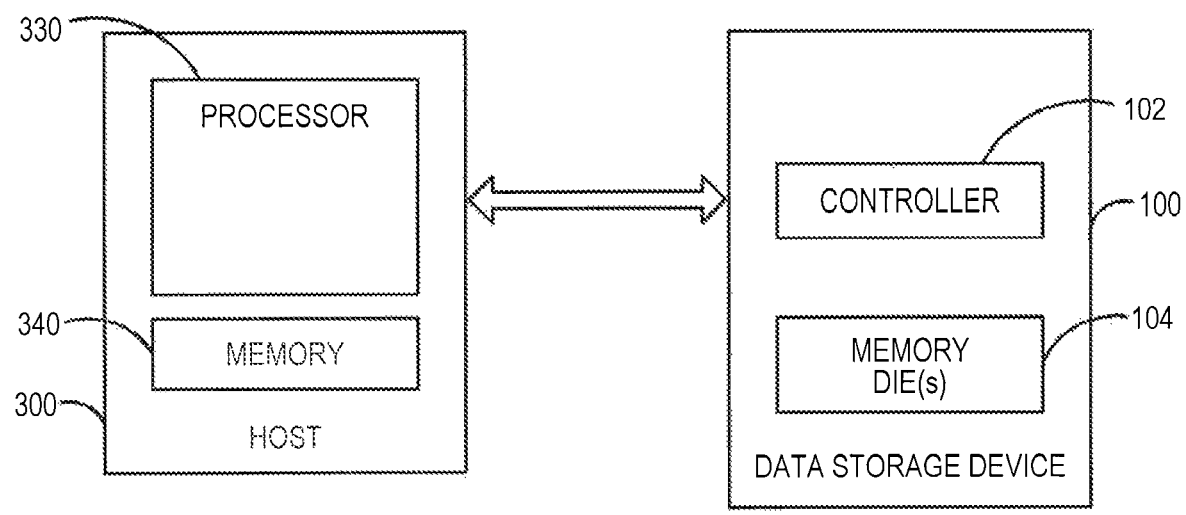
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As discussed above, a host can store data, such as a video stream, in a memory of a data storage device. If the host wants to later search the stored video for an object of interest, which is a common use case in surveillance systems, the host can retrieve the stored video from the memory of the data storage device and perform an image analysis operation on the retrieved video to determine if the video contains the object of interest. However, this can take up bandwidth on the input-output bus between the host and data storage device. Since the data storage device 100 in this embodiment has a controller/processor 102, the data storage device 100 (sometimes referred to herein as a computational storage device) can perform computations and send back the result to the host 300. Computational storage has the advantage of less data movement on the input-output bus with the host 300. So, instead of sending the video back to the host 300 for analysis, the controller 102 in the data storage device 100 can be used to search the video for the object of interest (e.g., by comparing each frame of the video with an image containing the object of interest). The result of the search can be a match/no-match signal sent back to the host 300. If there is a match, the host 300 can request the video or portion of the video that contains the object of interest.

Alternatively, the data storage device 100 can return the video/image(s) automatically as a result of the search.

In this process, direct memory access (DMA) speed and processing power are the bottlenecks, as the controller 102 of the data storage device 100 is primarily designed for basic command processing. To address this issue, a data storage device manufacture can add more processing capabilities and increase the internal DMA speed, but that would add to the cost.

The following embodiments provide an improved object-based search mechanism in the data storage device 100 that avoids adding cost to the data storage device 100 and the other drawbacks noted above. In general, with these embodiments, the controller 102 of the data storage device 100 performs an object analysis operation on incoming image frames as part of the storage process. If an object is identified in an image frame, the controller 102 notes that association. For example, the controller 102 can maintain a map or table that associates an image with an identified object. This can involve tagging the image with a tag for the object. That way, when the host 300 or other requestor later asks the data storage device 100 to identify the image frames that contain an object of interest, the data storage device 100 can use the map/table/tags to identify a subset of images that contain or may contain the object. Even if the subset of images contains false positives, the controller 102 only needs to perform an image processing operation on the subset instead of all the images stored in the memory 104 to narrow the results. This method will now be illustrated in conjunction with the flow chart 400 shown in FIG. 4.

Figure 4:
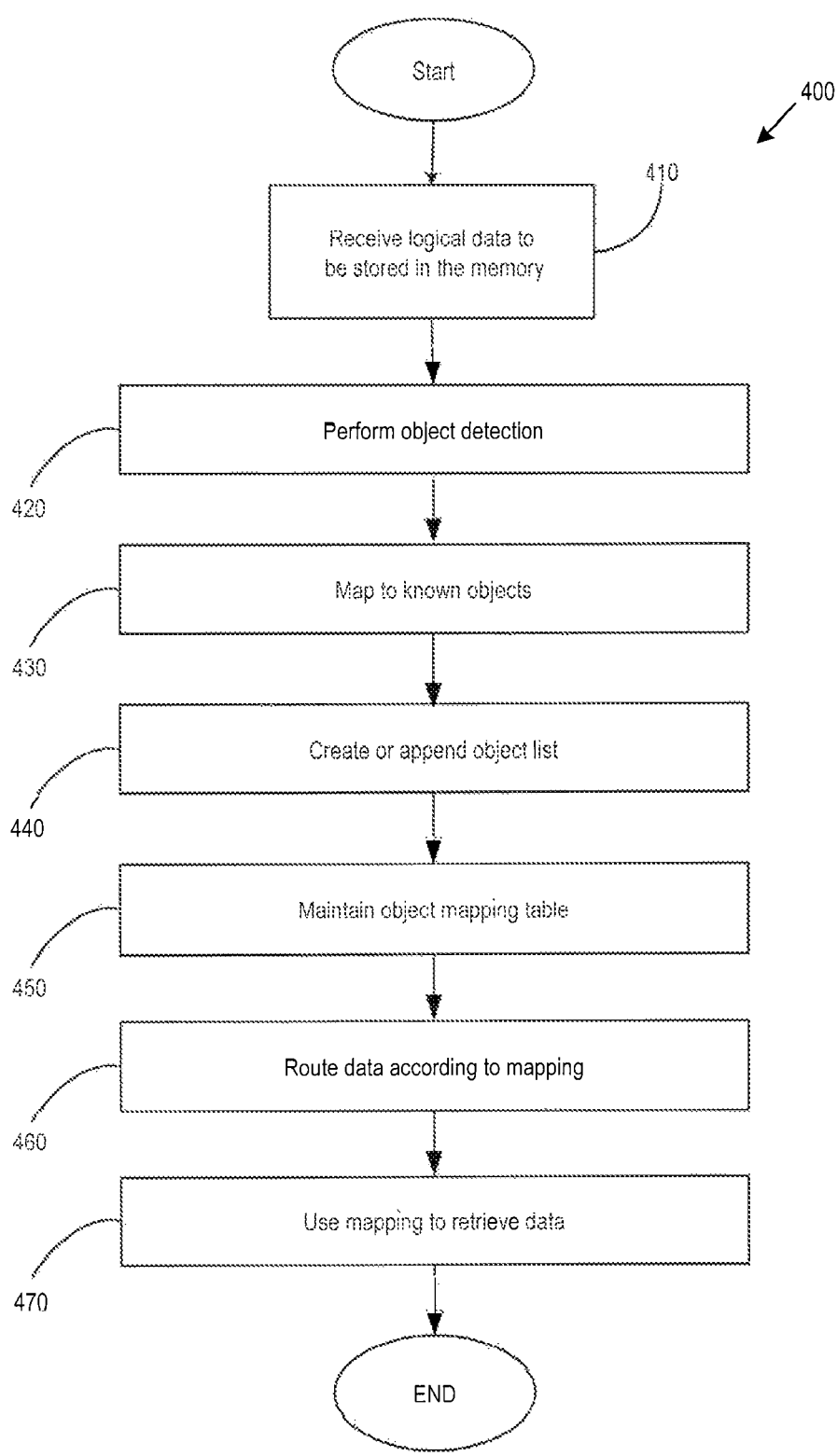
FIG. 4 is a flow chart of an object detection and tagging method of an embodiment.

As shown in FIG. 4, the data storage device 100 in this example receives logical data to be stored in the memory 104 (act 410). In this example, the logical data is a plurality of image frames (e.g., from one or more video streams, such as from video surveillance system(s)). Prior to storing the plurality of image frames in the memory 104 (e.g., as the image frames are being received or after they are received and are stored temporarily in a buffer), the controller 102 of the data storage device 100 performs an object detection operation on some or all of the plurality of image frames (act 420). Any suitable object detection technique, now known or later developed, can be used.

In this example, when the controller 102 detects an object in an image, the controller 102 maps the detected object to known objects (act 430). For example, the detected object can be compared to a library of known objects, and an association can be confirmed if the images of the detected and known objects match (e.g., a 100% match or a match to some lesser degree of granularity). Next, the controller 102 creates or appends an object list to associate the image frame with the mapped object (act 440). The controller 102 continues doing this for at least some of the other image frames and maintains the resulting object mapping table (act 450).

The controller 102 then stores the plurality of image frames in the memory 104. This can be done in any suitable way. For example, in one embodiment, the controller 102 routes the data to different areas of the memory 104 (e.g., different memory dies or different areas in one memory die) according to the mapping (act 460). In this way, the controller 102 can store the plurality of image frames in different areas in the memory 104 such that image frames associated with different objects are stored in different areas in the memory 104. As will be described in more detail below, the controller 102 can use the mapping to later retrieve relevant image frames in response to a search request (act 470).

Figure 5:
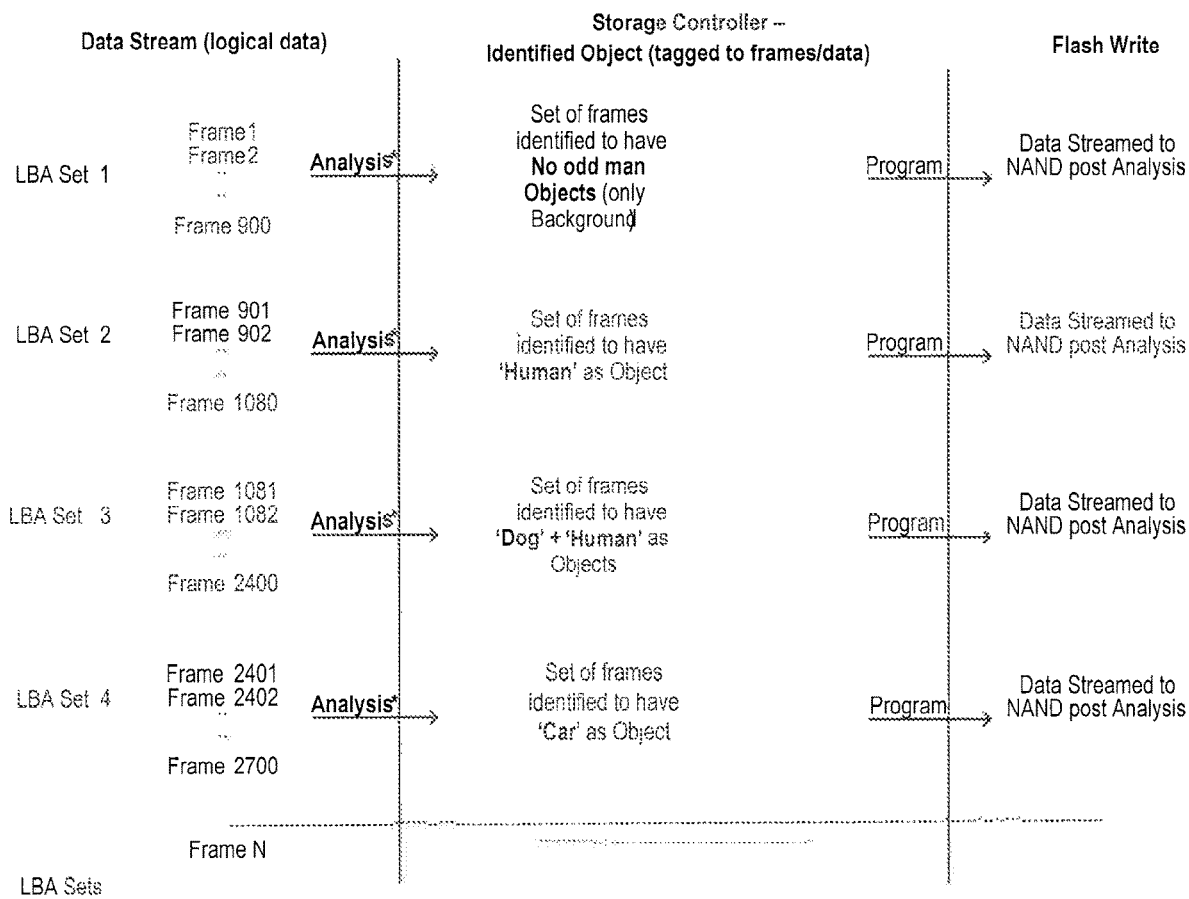
FIG. 5 is a diagram illustrating a storage workload-based analysis of an embodiment.

Turning again to the drawings, FIG. 5 is an illustration of an example use case of an embodiment. In this example, the plurality of image frames (here, Frame 1 to Frame N) are organized as a plurality of sets of image frames based on logical block addresses (LBAs). Some or all of these sets can be from the same video stream (e.g., same surveillance video from a camera) or from different video streams (e.g., different surveillance videos from different cameras). As shown in FIG. 5, as the image frames are received by the controller 102, the controller 102 performs image analysis to identify objects in the plurality of image frames. In this example, the controller 102 does not identity any known objects in Set 1 (this could be designated as a "background capture"). However, the controller 102 identifies a human in Set 2, a dog and human in Set 3, and a car in Set 4. As illustrated by this example, a given set can contain multiple objects. In this way, even though the image data is written only once, it can be retrieved many times during a search operation.

After the objects have been detected in a set of image frames, the set of image frames is sent to the memory 104 for storage. As noted above, the images can be stored in different areas of memory 104 designated for different objects. That is, during object tagging, the data is routed to storage blocks in accordance with the identified objects.

Object identification and tagging the entire set of images can be controller intensive, especially given the normal workload of the controller 102. Accordingly, as noted above, the controller 102 can perform object detection and tagging on only some of the image frames in a set prior to storage. The controller 102 can determine the interval for tagging the data frame according to the identified objects in the received data frame, and the interval can be determined based on any suitable factor. For example, in one embodiment, the interval is determined based on a workload of the controller 102. Operations that may contribute to the workload of the controller 102 include, but are not limited to, a garbage collection operation, a wear leveling operation, a read scrubbing operation, or a memory failure handling operation. In this way, the quality of service (QoS) of the identification and frame tagging (the frequency of analysis) can be dynamically adjusted based on the inherent storage capability and workload of the controller 102. For example, during times of a relatively-low workload, the controller 102 can tag one out of every 30 frames. In contrast, during times of a relatively-high workload, the controller 102 can dynamically reduce the tagging frequency to one out of every 150 frames.

Figure 6:
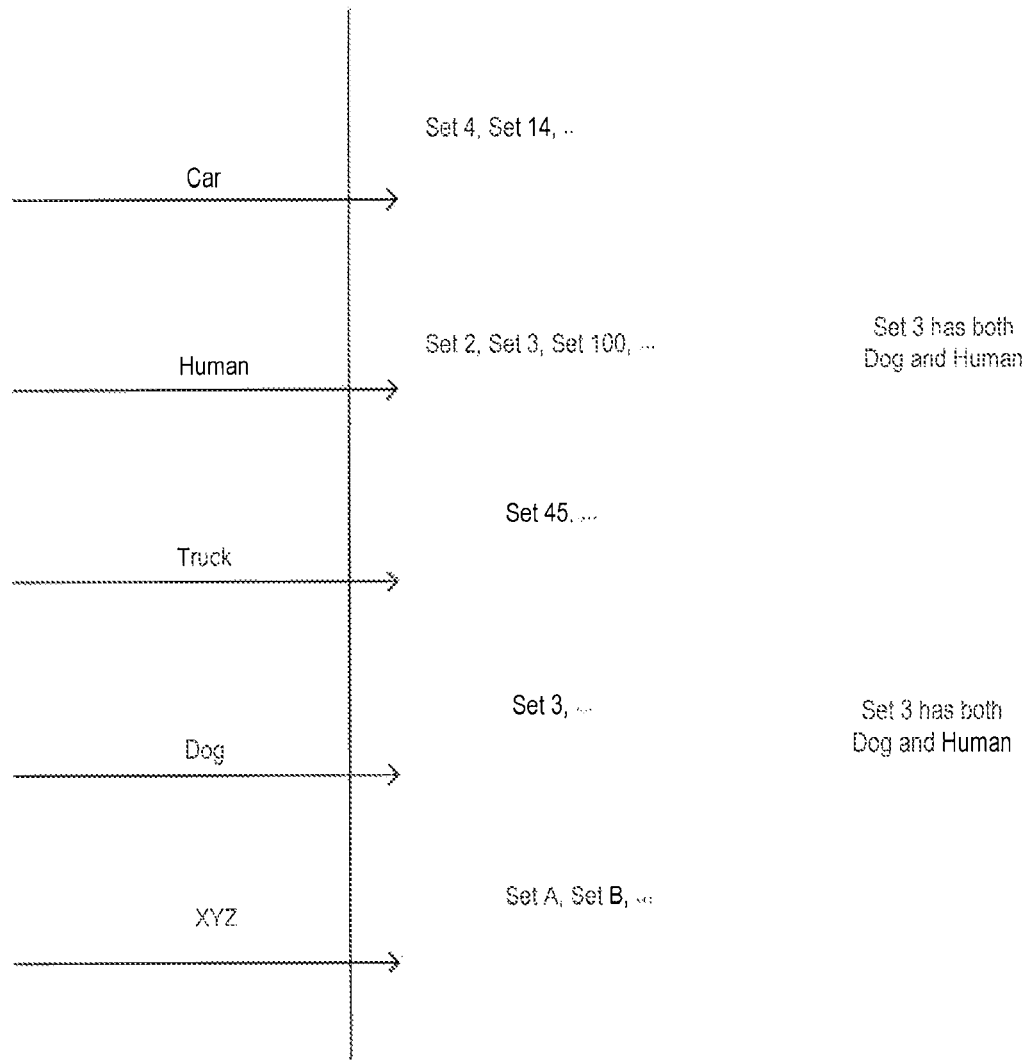
FIG. 6 is a diagram illustrating object-based table formation and storage of ab embodiment.

The controller 102 also maintains a map that associates each identified object with image frames of the plurality of images frames that contain the identified object. This is diagrammatically illustrated in FIG. 6. As shown in FIG. 6, the mapping keeps track of which image sets are associated with various objects. Sets that contain multiple objects are noted. The set of all tag metadata can be stored in a table against corresponding video frame numbers and/or logical addresses of written data. The object tag table can be subsequently stored in the data storage device 100, such as to a specific logical unit number (LUN) in a separate control block in the memory 104. The table can be device driven and device specific. Hence, the table can be stored in the memory 104 managed by device, such as in a control block abstracted from the host side. Also, during data writes, the table keeping track of various logical sets containing different objects can be updated and flushed to the memory 104 periodically.

Figure 7:
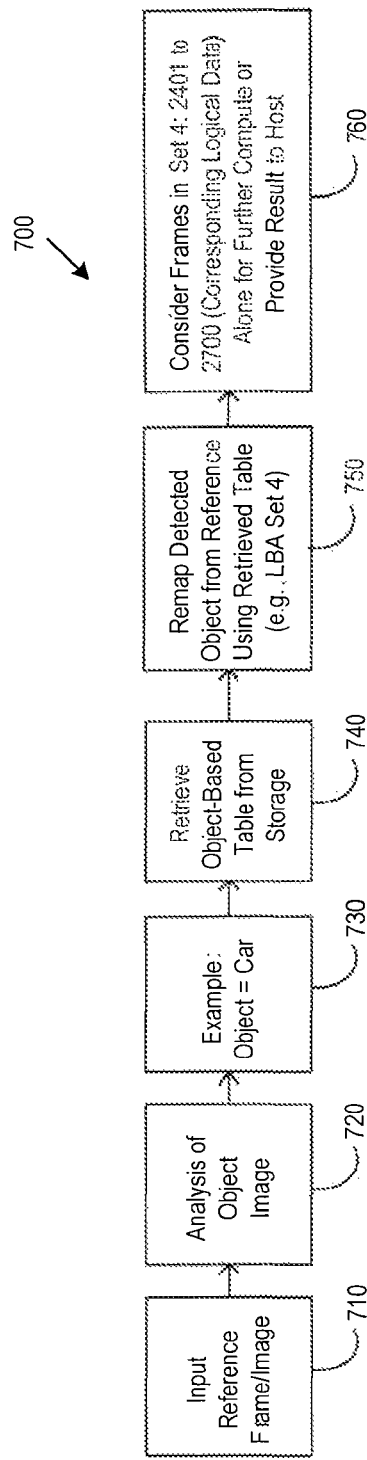
FIG. 7 is a diagram illustrating an optimized object matching mode of an embodiment.

Tagging image frames prior to storage can facilitate the image search process later. This is illustrated in the flow chart 700 in FIG. 7. As shown in FIG. 7, when the host 300 wants to retrieve images that contain an object of interest, the host 300 can send the data storage device 100 a reference image that contains the target object of interest (act 710). The controller 102 of the data storage device 100 then performs an object detection operation on the reference image to detect the object of interest in the reference image (act 720). In this example, the detected object is a car (act 730). Alternative, the host 300 or another entity can perform the object detection operation on the reference image, so the data storage device 100 is just provided with the object information and does not have to perform object detection.

Once the controller 102 knows the object to be searched, the controller 102 searches the object mapping discussed above to identify which image frames of the stored plurality of image frames are associated with the object of interest (act 740). In this example, the object of interest is a car, and the mapping shows that the image frames in Set 4 are image frames that have been tagged as containing a car (act 750). The controller 102 can use this information to respond to the request in any suitable way (act 760). For example, the controller 102 can send the identified image frames, the logical block address of the identified image frames, or the frame numbers of the identified image frames (e.g., if the data is scalable video data) back to the host 300. After receiving the images from the data storage device 100, the host 300 can perform additional image analysis of the image frames to determine which, if any, of the image frames actually contain the object of interest.

As another example, the controller 102 can perform image processing (e.g., high precision detection) on the identified image frames (e.g., to determine which, if any, of the image frames actually contain the object of interest). That is, during the object detection phase, the controller 102 can retrieve the stored tag table (e.g., frame vs object tag table) from the memory 104 and compare the object identified in the reference only against those logical data or frames whose object tag matches in the table, thereby minimizing searching to a smaller set of data. The search QoS can be a function of the tagging QoS, which in turn can be a function of the storage workload.

As yet another example, the controller 102 can archive the identified image frames (e.g., in a cold storage area of the memory 104 or in another device). Additionally, the protection/endurance of the identified image frames can be increased internally in the memory 104.

There are many advantages associated with these embodiments. For example, by segregating data based on objects at the time of data storage, the controller 102 can optimize its search logic by searching only a sub-set of the entire data when later requested to find images containing an object of interest. Also, these embodiments allow one-time data analysis to be performed and used for multiples match requests. Further, these embodiments are consistent with in-compute storage application use cases Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a controller comprising hardware and configured to:
   receive a plurality of image frames for storage in the memory, wherein each image frame is associated with a logical block address;
   determine a number of image frames on which to perform an image analysis operation, wherein the number of image frames is dynamically determined based on a workload of the controller;
   for each image frame in the determined number of image frames:
   perform the image analysis operation to detect an object in the image frame;
   compare the detected object to a library of known objects;
   in response to the detected object matching a known object in the library above a threshold matching level, update a map to map the known object with a logical block address associated with the image frame; and
   store the image frame in a physical area of the memory that is designated to store image frames mapped to the known object;
   receive a request for image frames that contain a known object of interest;
   use the map to identify logical block addresses of image frames that are associated with the known object of interest; and
   send the image frames that are associated with the known object of interest in response to the request.

2. The data storage device of claim 1, wherein the controller is further configured to archive the image frames that are associated with the known object of interest.

3. The data storage device of claim 1, wherein the workload of the controller comprises a garbage collection operation.

4. The data storage device of claim 1, wherein:
   the plurality of image frames is organized as a plurality of sets of image frames; and
   the map is configured to associate each known object with a set that contains an image frame that contains its associated detected object.

5. The data storage device of claim 1, wherein the plurality of image frames is from one or more surveillance videos.

6. The data storage device of claim 1, wherein the memory comprises a three-dimensional memory.

7. The data storage device of claim 1, wherein the number comprises less than a number of all of the plurality of image frames.

8. The data storage device of claim 1, wherein the workload of the controller comprises a wear leveling operation.

9. The data storage device of claim 1, wherein the workload of the controller comprises a read scrubbing operation.

10. The data storage device of claim 1, wherein the workload of the controller comprises a memory failure handling operation.

11. A method comprising:
   performing in a data storage device comprising a memory and a controller comprising hardware:

receiving a plurality of image frames for storage in the memory, wherein each image frame is associated with a logical block address;

determining a number of image frames on which to perform an image analysis operation, wherein the number of image frames is dynamically determined based on a workload of the controller;

for each image frame in the determined number of image frames:
- performing the image analysis operation to detect an object in the image frame;
- comparing the detected object to a library of known objects;
- in response to the detected object matching a known object in the library above a threshold matching level, updating a map to map the known object with a logical block address associated with the image frame; and
- storing the image frame in a physical area of the memory that is designated to store image frames mapped to the known object;

receiving a request for image frames that contain a known object of interest;

using the map to identify logical block addresses of image frames that are associated with the known object of interest; and sending at least one of the following in response to the request: the image frames that are associated with the known object of interest, the logical block addresses of the image frames that are associated with the known object of interest, or frame numbers of the image frames that are associated with the known object of interest.

12. The method of claim 11, wherein the workload of the controller comprises a garbage collection operation.

13. The method of claim 11, wherein:
the image frames are organized as a plurality of sets of images frames; and
the table associates each known object with a set that contains an image frame that contains its associated detected object.

14. The method of claim 11, wherein the workload of the controller comprises a wear leveling operation or a read scrubbing operation.

15. The method of claim 11, wherein the workload of the controller comprises a memory failure handling operation.

16. A data storage device comprising:
a memory; and
means for:
- receiving a plurality of image frames for storage in the memory, wherein each image frame is associated with a logical block address;
- determining a number of image frames on which to perform an image analysis operation, wherein the number of image frames is dynamically determined based on a workload of the controller;
- for each image frame in the determined number of image frames:
  - performing the image analysis operation to detect an object in the image frame;
  - comparing the detected object to a library of known objects;
  - in response to the detected object matching a known object in the library above a threshold matching level, updating a map to map the known object with a logical block address associated with the image frame; and
  - storing the image frame in a physical area of the memory that is designated to store image frames mapped to the known object;
- receiving a request for image frames that contain a known object of interest;
- using the map to identify logical block addresses of image frames that are associated with the known object of interest; and
- sending the logical block addresses or frame numbers of the image frames that are associated with the known object of interest in response to the request;

wherein the means comprises a controller comprising hardware.

* * * * *